United States Patent
Whelan

(10) Patent No.: US 6,564,755 B1
(45) Date of Patent: May 20, 2003

(54) PREHEATING ASSEMBLY FOR HOT WATER SYSTEM

(76) Inventor: Thomas I. Whelan, 1621 Dorothy Ave., Dixon, IL (US) 61021

( * ) Notice: Subject to any disclaimer, the term of this patent is extended or adjusted under 35 U.S.C. 154(b) by 0 days.

(21) Appl. No.: 10/090,171

(22) Filed: Mar. 5, 2002

(51) Int. Cl.[7] ................................................. F22D 1/02
(52) U.S. Cl. .................... 122/20 B; 122/421; 165/47; 165/901; 165/909
(58) Field of Search .............................. 122/20 B, 20 R, 122/155.2, 155.3, 421; 165/47, 901, 909; 126/101; 237/19

(56) References Cited

U.S. PATENT DOCUMENTS

| | | | |
|---|---|---|---|
| 4,037,567 A | 7/1977 | Torres ....................... | 122/20 B |
| 4,043,014 A | 8/1977 | Wilson ....................... | 29/157.4 |
| 4,090,474 A | 5/1978 | Kauffmann ................. | 122/20 B |
| 4,122,801 A | 10/1978 | Burns ........................ | 122/20 B |
| 4,157,706 A | 6/1979 | Gaskill ....................... | 126/271 |
| 4,175,518 A | * 11/1979 | Reames, Jr. ............... | 122/20 B |
| 4,275,687 A | 6/1981 | Sasaki ....................... | 122/20 B |
| 4,316,434 A | 2/1982 | Bailey ....................... | 122/20 B |
| 4,373,473 A | 2/1983 | Grandmont ................ | 122/20 B |
| 4,406,402 A | 9/1983 | Henriques .................. | 237/19 |
| 4,429,661 A | * 2/1984 | McClure .................... | 122/20 B |
| 4,454,911 A | 6/1984 | Arbabian ................... | 165/104.19 |
| 4,484,564 A | 11/1984 | Erickson .................... | 126/365 |
| 4,660,511 A | * 4/1987 | Anderson .................. | 122/420 |
| 4,699,091 A | 10/1987 | Waters ...................... | 122/20 A |
| 4,821,682 A | 4/1989 | Waters ...................... | 122/20 A |
| 4,887,586 A | 12/1989 | Walters ...................... | 126/101 |
| 4,938,172 A | 7/1990 | Belovarac .................. | 122/20 B |
| 5,097,801 A | 3/1992 | Burns ........................ | 122/20 B |
| 5,406,934 A | 4/1995 | Cain .......................... | 126/117 |
| 5,823,175 A | 10/1998 | Sweitzer et al. ............ | 126/34 |

* cited by examiner

*Primary Examiner*—Gregory Wilson
(74) *Attorney, Agent, or Firm*—Roylance, Abrams, Berdo & Goodman, L.L.P.

(57) ABSTRACT

A heat recovery system includes a heat exchanger surrounding a flue pipe from a furnace for preheating water. The heat exchanger includes a sleeve surrounding the flue pipe to define an annular space and form a water jacket in direct contact with the flue pipe. Several water storage tanks are connected in series and mounted around the sleeve to absorb heat from the water jacket. The outer water tanks are connected to one end of the water jacket at the downstream end of the flue pipe so that water is carried sequentially through each of the water tanks and through the water jacket surrounding the flue pipe. Typically, the water jacket includes a plurality of baffles to define a tortuous path through the water jacket. A conduit for supplying water to the outer water tanks can be wrapped around the downstream end of the flue pipe in a spiral manner to preheat the water prior to feeding to the water tanks. The preheated water exiting the upstream end of the water jacket can also pass through a conduit that is wrapped around the flue pipe in a spiral fashion to further heat the water before directing to a conventional water heater or domestic water supply.

22 Claims, 7 Drawing Sheets

PREHEATING ASSEMBLY FOR HOT WATER SYSTEM

FIELD OF THE INVENTION

The present invention is directed to a preheating assembly for heating water using waste heat from a furnace or other heat source. The invention is also directed to a heat exchange assembly for preheating water where the heat exchanger is connected to a flue pipe of a furnace or heating unit.

BACKGROUND OF THE INVENTION

It is well known that exhaust gases exiting a furnace or heating device from the combustion of a fuel such as oil, gas, coal or wood are at relatively high temperatures. The exhaust gases are typically discharged to the outside such that a large percentage of the heat is not recovered and eventually discharged to the outside.

Many efforts have been made to increase the efficiency of the heating unit by improving combustion and improving the heat recovery of the system. A number of these prior devices are used to preheat water for domestic use by using the exhaust gases from the heating system. One example is disclosed in U.S. Pat. No. 4,406,402 to Henriques. This device discloses a flue gas heat recovery system that includes an air heat exchanger for recovering heat from the exhaust gas. The heated air is then supplied to a second heat exchanger for preheating water which is eventually supplied to a conventional water tank. A control system provides a failsafe system to prevent overheating of the water and the potential danger of overheating the water tank.

A number of devices for extracting heat from waste gases include a heat exchanger that is positioned in the flue pipe or chimney to directly contact the exhaust gases. One example is disclosed in U.S. Pat. No. 4,484,564 to Erickson. This device includes a pipe that is formed into a coil and positioned directly in a chimney. A series of baffles are coupled to the coil to improve the heat exchange between the exhaust gas and the water passing through the coil.

Another example is disclosed in U.S. Pat. No. 4,821,682 to Waters. The device includes an auxiliary storage tank that receives incoming cold water. Water from the storage tank circulates through a conduit loop which extends in a spiral pattern through the flue and through a heat exchanger which concentrates heat generated by the pilot burner. The water that is preheated in the loop is returned to the storage tank for storage until required by the main tank.

Still another example is disclosed in U.S. Pat. No. 4,037,567 to Torres. This patent discloses a heating system including a boiler having an exhaust flue. A pair of concentrically arranged coils are positioned in the exhaust flue and is connected to the conduit for feeding water to the boiler. The water circulates through the loop by natural convection to preheat the water before being supplied to the boiler.

U.S. Pat. No. 4,122,801 to Burns discloses a flue pipe for connecting to a furnace where the flue pipe includes a plurality of spiral coils. The spiral coils are connected to a header pipe for circulating water through the coils to extract heat from the exhaust gas. Still another example is disclosed in U.S. Pat. No. 4,938,172 to Belovarac. This patent discloses a supplementary hot water heating system for transferring water to a hot water tank. The heating system includes a coil positioned in the flue pipe which is supplied with water from a cold water supply and feeds the heated water to a conventional water tank.

In each of the above devices, the heat exchanger, such as a coil, is positioned directly in the flow path of the exhaust gases. A disadvantage of this arrangement is that the heat exchangers create resistance in the flue pipe and restrict the flow of exhaust gases to the outside. In addition, the coils positioned directly in the flue can cause deposits on the coils, which can be difficult to clean. To overcome this disadvantage, several devices have been proposed that surround an existing flue pipe to recover heat from the exhaust gases. For example, U.S. Pat. No. 5,823,175 to Sweitzer et al. discloses a sleeve surrounding a flue pipe where the sleeve forms a jacket. Water is supplied through the jacket to preheat the water which is then supplied to a conventional hot water heater.

The above-noted devices have been generally successful for their intended purpose of recovering waste heat. However, there is a continuing need in the industry for an improved heat recovery system for extracting waste heat from an exhaust gas.

SUMMARY OF THE INVENTION

The present invention is directed to a heat recovery system for recovering waste heat from an exhaust gas flue. In particular, the invention is directed to a heat exchanger connected to a flue pipe for recovering waste heat and preheating water for domestic hot water use.

Accordingly, a primary aspect of the invention is to provide a heat exchanger with an outer water jacket surrounding a flue pipe where the water jacket does not interfere with the flow of exhaust gases through the flue pipe.

Another aspect of the invention is to provide a heat exchanger in direct contact with the outer surface of a flue pipe having an outer water jacket with at least one baffle therein to provide a tortuous path of the water flowing through the jacket.

A further aspect of the invention is to provide a heat exchanger cooperating with a flue pipe for recovering waste heat where the heat exchanger includes an outer water jacket surrounding the flue pipe and where the jacket includes a spiral baffle to produce a spiral path to the water passing through the jacket.

Still another aspect of the invention is to provide a heat recovery system for recovering waste heat from exhaust gases where the system includes a water jacket surrounding a flue pipe and a plurality of holding tanks in direct contact with the outer wall of the jacket and in fluid communication with the jacket.

A further aspect of the invention is to provide a heat recovery system for recovering waste heat from exhaust gases where the system includes an outer water jacket surrounding a flue pipe and a spiral wound pipe surrounding the flue pipe at the upstream end and at the downstream end of the water jacket where the water flows continuously through the spiral wound pipes and the water jacket.

A further aspect of the invention is to provide a heat recovery system including a heat exchanger surrounding a flue pipe where the heat exchanger includes a water jacket surrounding the flue pipe and several water tanks connected in series surrounding the water jacket and connected to the water jacket for supplying water from the tanks to the water jacket.

The various aspects of the invention are basically attained by providing a water heating assembly comprising a furnace for discharging hot exhaust gases and having a flue pipe for discharging the hot exhaust gases. The flue pipe has an axial passage with an inlet end for receiving the hot combustion gases and an outlet end for discharging the hot combustion gases. The flue pipe has an outer surface and an inner surface defining the axial passage. A first baffle member is coupled to the inner surface of the flue pipe and extends inwardly into the axial passage to produce turbulence of the exhaust gases flowing through the axial passage. A substantially cylindrical sleeve is provided which has an upstream end at the upstream end of the flue pipe and a downstream end at the downstream end of the flue pipe. The sleeve is spaced outwardly from the flue pipe to define a water jacket in contact with and surrounding the flue pipe. An inlet pipe is coupled to the downstream end of the sleeve for feeding water into the water jacket. An outlet pipe is coupled to the upstream end of the sleeve for discharging water from the water jacket. A plurality of water tanks is arranged parallel to each other and are connected together in series for feeding water sequentially through each of the water tanks. The water tanks are in heat exchange contact with the sleeve and are arranged to surround the sleeve. At least one of the water tanks is connected to the inlet pipe of the water jacket. A first heat exchange pipe encircles the flue pipe a plurality of turns at the downstream end and is in heat exchange contact with the flue pipe. The first heat exchange pipe has an inlet end connected to a water supply and an outlet end coupled to at least one of the water tanks. A second heat exchange pipe encircles the flue pipe a plurality of turns at the upstream end and is in heat exchange contact with the flue pipe. The second heat exchange pipe has an inlet end coupled to the outlet pipe for receiving water from the water jacket and an outlet end for supplying hot water.

The aspects of the invention are further attained by providing a water heating assembly comprising a flue pipe having an inlet end for receiving hot exhaust gases and an outlet end for discharging the exhaust gases. A substantially cylindrical sleeve is provided which has an upstream end at the upstream end of the flue pipe and a downstream end at the downstream end of the flue pipe. The sleeve is spaced outwardly from the flue pipe to define a water jacket in contact with the flue pipe. An inlet pipe is coupled to the downstream end of the sleeve for feeding water into the water jacket. An outlet pipe is coupled to the upstream end of the sleeve for discharging water from the water jacket. A plurality of water tanks are arranged parallel to each other and are connected together in series for feeding water sequentially through each of the water tanks. The water tanks are in heat exchange contact with the sleeve and are arranged to surround the sleeve. At least one of the water tanks is connected to the inlet pipe. A first heat exchange pipe encircles the flue pipe a plurality of turns at the downstream end and is in heat exchange contact with the flue pipe. The first heat exchange pipe has an inlet end connected to a water supply and an outlet end coupled to at least one of the water tanks. A second heat exchange pipe encircles the flue pipe a plurality of turns at the upstream end and is in heat exchange contact with the flue pipe. The second heat exchange pipe has an inlet end coupled to the outlet pipe for receiving water from the water jacket and an outlet end for supplying hot water.

The aspects of the invention are also attained by providing a heat exchange assembly comprising a flue pipe having an upstream end for receiving hot exhaust gases and a downstream end for discharging the exhaust gases. A sleeve surrounds the flue pipe and has an upstream end and a downstream end. The upstream end is proximate the upstream end of the flue pipe. The sleeve is spaced outwardly from the flue pipe to define a water jacket. The water jacket has a water inlet at the downstream end of the flue pipe and a water outlet at the upstream end of the flue pipe. A plurality of parallel water holding tanks contact an outer surface of the sleeve. Each of the water holding tanks has an inlet at a first end and an outlet at a second end, and are connected together in series. At least one of the water holding tanks has a respective inlet connected to a water source for supplying water sequentially through each of the water holding tanks. At least one of the holding tanks has its respective outlet connected to the inlet of the water jacket at the downstream end of the flue pipe, whereby water flows through the water holding tanks and the water jacket.

These and other aspects of the invention will become apparent from the following detailed description of the invention in conjunction with the annexed drawings which form a part of this original disclosure.

BRIEF DESCRIPTION OF THE DRAWINGS

The following is a brief description of the drawings in which.

DETAILED DESCRIPTION OF THE INVENTION

The present invention is directed to a heat recovery system for extracting waste heat from exhaust gases being discharged from a furnace. In particular, the invention is directed to a heat exchanger for use in conjunction with a flue pipe to preheat water by extracting waste heat from the exhaust gases.

Figure 1:
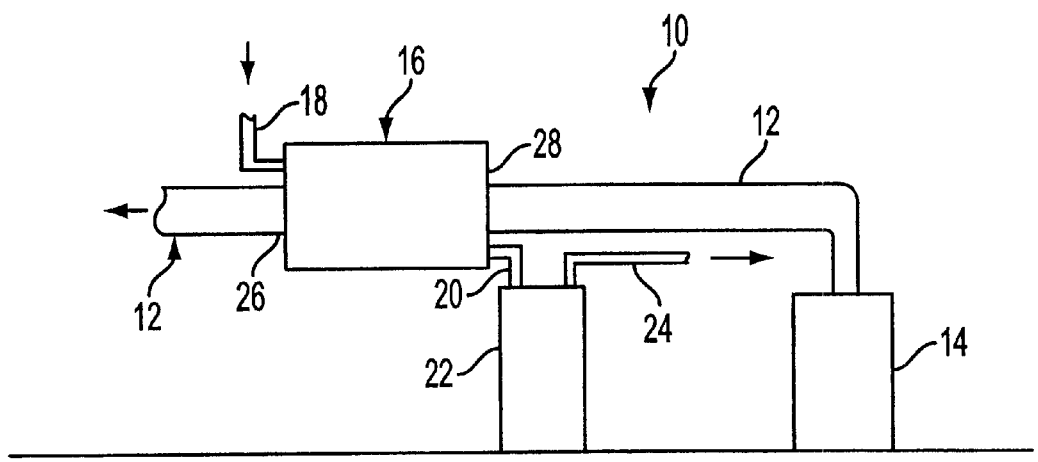
FIG. 1 is a schematic view of the heat recovery system in a first embodiment of the invention.

Referring to the drawings, the invention is primarily directed to a heat recovery system 10 that is connected to a flue pipe 12 for extracting waste heat from the exhaust gases being discharged through the pipe 12. FIG. 1 illustrates one embodiment of the invention where flue pipe 12 is connected to a furnace 14. Furnace 14 is generally a conventional furnace that is fueled by gas, oil or wood. Flue pipe 12 extends from the exhaust gas outlet of furnace 14 to a chimney or other discharge outlet (not shown). A heat exchanger 16 is connected to flue pipe 12 to recover heat from the exhaust gases passing through flue pipe 12 as discussed hereinafter in greater detail. Heat exchanger 16 in the embodiment illustrated, includes a water inlet 18 for supplying cold water from a water source and a water outlet 20. Water outlet 20 is connected to and supplies preheated water to a conventional water heater 22. Water heater 22 further heats the water as necessary to the desired temperature and includes an outlet 24 for supplying the hot water for domestic use or other uses.

In a preferred embodiment, heat exchanger 16 is positioned as close to furnace 14 as possible to minimize heat loss between furnace 14 and heat exchanger 16. Typically, water inlet 18 of heat exchanger 16 is supplied to the downstream side 26 of flue pipe 12 and water outlet 20 is provided at an upstream end 28 of pipe 12.

Figure 2:
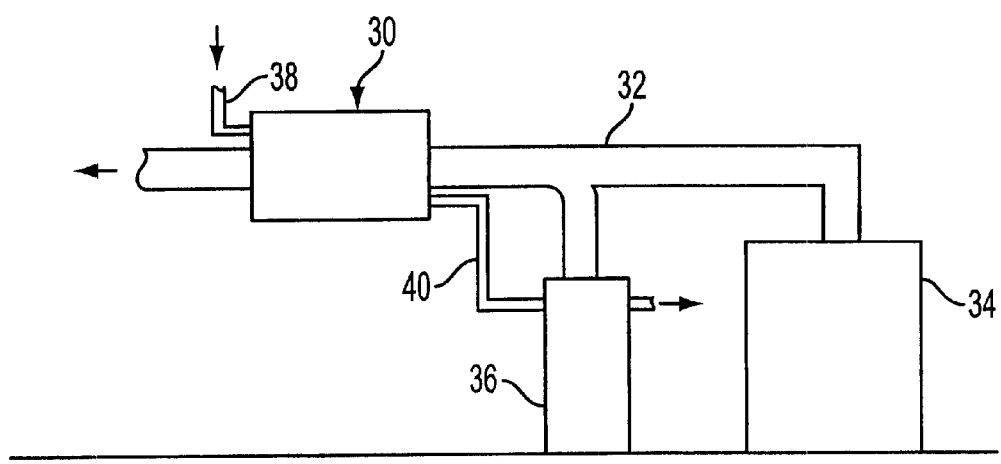
FIG. 2 is a schematic diagram of the heat recovery system in a second embodiment of the invention.

In a second embodiment of the invention shown in FIG. 2, the heat recovery system includes a heat exchanger 30 coupled to a flue pipe 32. Flue pipe 32 is connected to the exhaust outlet of a furnace 34 and to the exhaust gas outlet of a gas fired water heater 36. As in the previous embodiment, heat exchanger 30 includes a water inlet 38 and a water outlet 40 connected to water heater 36.

Heat exchanger 30 is substantially identical to heat exchanger 16 of the embodiment of FIG. 1. For purposes of illustration, the following description refers to heat exchanger 16. It will be understood that the following description is applicable to heat exchanger 30 and that heat exchanger 16 can be used in other systems where it is desirable to recover waste heat.

Figure 3:
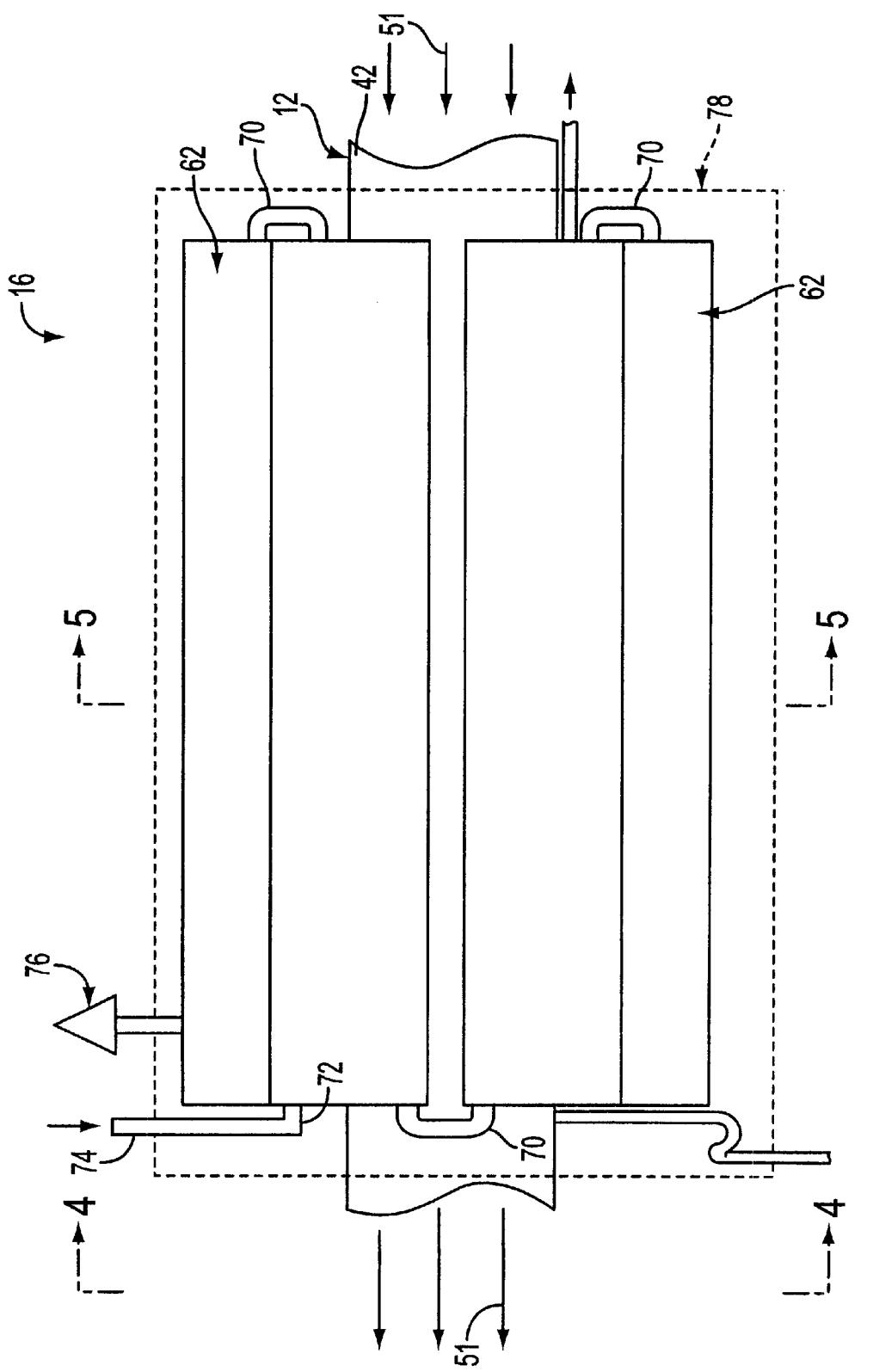
FIG. 3 is a side view of the heat exchanger in a first embodiment of the invention connected to a flue pipe of a furnace.
Figure 4:
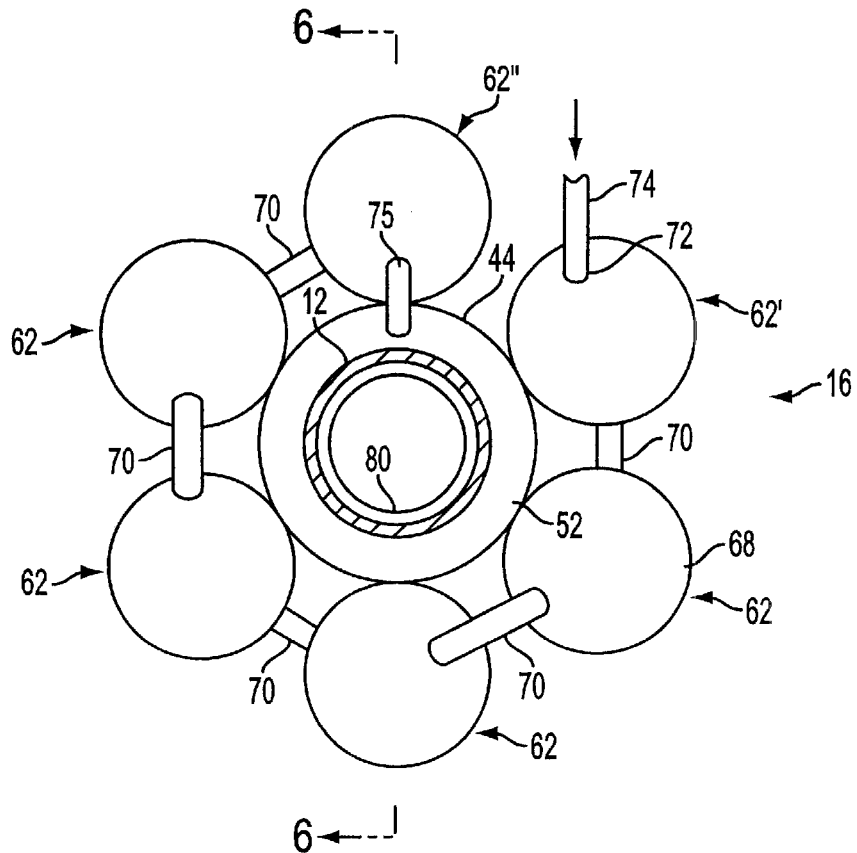
FIG. 4 is an end view of the heat exchanger of the embodiment of FIG. 3 as seen along line 4—4 of FIG. 3.
Figure 5:
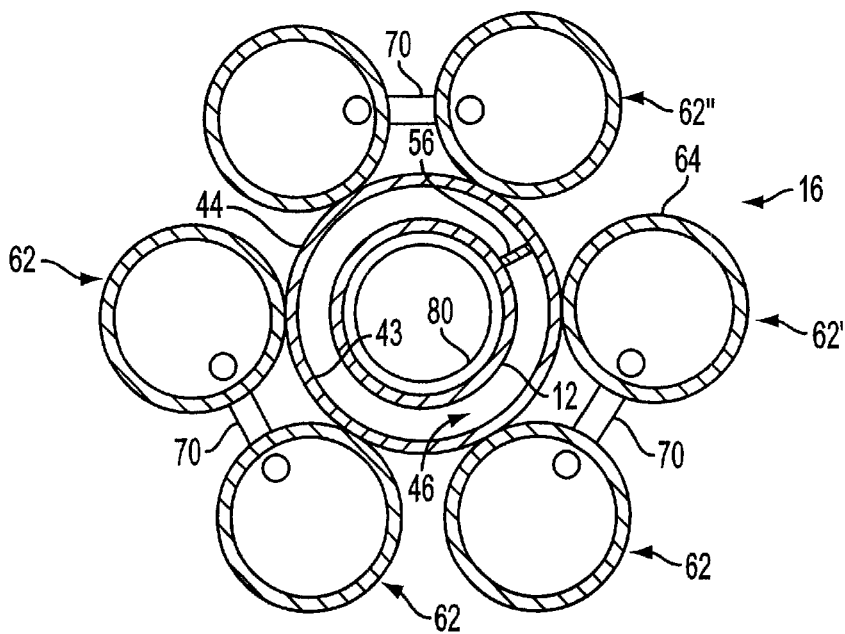
FIG. 5 is a cross-sectional end view of the heat exchanger of FIG. 3 taken along line 5—5 of FIG. 3.

Referring to FIG. 3, a first embodiment of heat exchanger 16 is illustrated. As shown in FIGS. 3–5, heat exchanger 16 surrounds flue pipe 12 and is coupled directly to an outer surface 42 of flue pipe 12. Referring to FIGS. 4 and 5, heat exchanger 16 includes a sleeve 44 having a substantially cylindrical shape surrounding flue pipe 12. Sleeve 44 is preferably coaxially aligned with flue pipe 12 and is spaced radially outward from flue pipe 12 to form a water jacket having an annular space 46 between sleeve 44 and outer surface 42 of pipe 12. As shown in FIG. 5, annular space 46 has a substantially uniform width and extends the entire length of sleeve 44.

Figure 6:
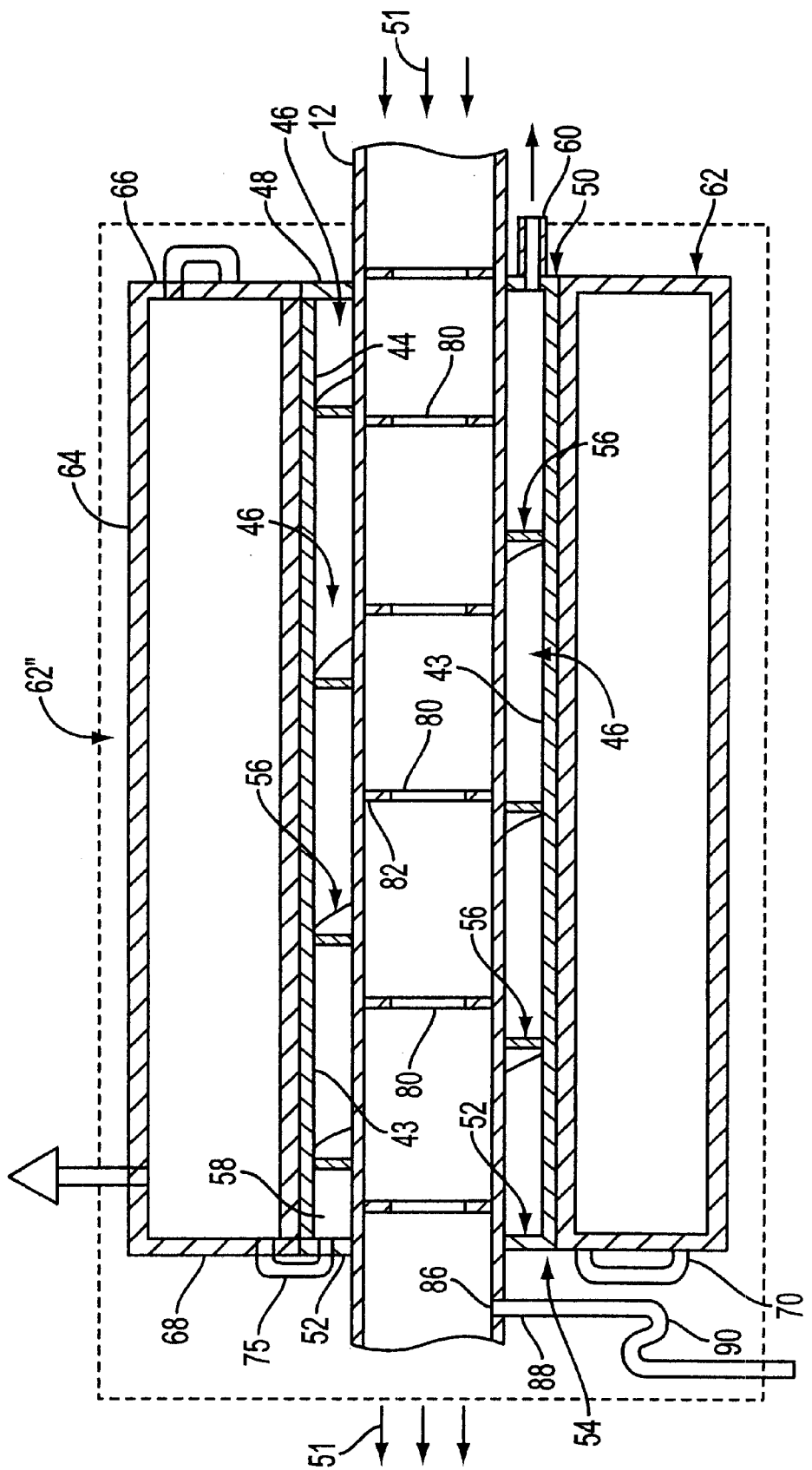
FIG. 6 is a cross-sectional side view of the heat exchanger taken along line 6—6 of FIG. 4.

Referring to FIG. 6, sleeve 44 includes an annular end plate 48 at the upstream end 50 of sleeve 44 to close the annular space 46. As used herein, the term upstream refers to the feed direction of flue gases through pipe 12 such that the flue gases flow from the upstream to the downstream end of heat exchanger 16 in the direction of arrows 51. End plate 48 preferably has a central opening dimensioned to fit around flue pipe 12 to form a watertight seal. An outer annular edge of end plate 48 is dimensioned to cooperate with the end of sleeve 44. Sleeve 44 also includes an annular shaped end plate 52 at the downstream end 54 of sleeve 44. End plate 52 includes an outer edge coupled to sleeve 44 and an inner edge coupled to the outer surface of pipe 12. End plates 48 and 52 are coupled to sleeve 44 and to outer surface 42 of flue pipe 12 to form a watertight seal and to define a water jacket surrounding flue pipe 12. In preferred embodiments of the invention, sleeve 44 and end plates 48 and 52 are made of metal that are welded along their respective edges to enclose annular space 46. Typically, flue pipe 12 is made of steel or other heat resistant metal. End plates 48 and 52 can be welded directly to flue pipe 12 to form a watertight seal. Alternatively, other methods of forming a watertight seal between annular end plates 48 and 52 can be used depending on the materials used.

In the embodiment of FIGS. 3–6, annular space 46 includes an internal baffle 56. As shown in FIG. 6, baffle 56 extends between the outer surface 42 of pipe 12 and an inner surface 43 of sleeve 44 and extends in a spiral path around annular space 46 between upstream end 50 and downstream end 54 of sleeve 44. As shown in FIG. 6, end plate 52 includes an inlet 58 for supplying water into annular space 46. End plate 50 includes an outlet 60 for discharging water from annular space 60. In this embodiment, baffle 56 is arranged to form a spiral path for the water passing through annular space 46 in the direction of from downstream end 54 to upstream end 50 of sleeve 44.

Referring to FIGS. 4 and 5, several water holding tanks 62 are provided to surround sleeve 44. Water tanks 62 generally have an axial length at least equal to the axial length of the sleeve 44. Preferably, water tanks 62 are in direct contact with the outer surface of sleeve 44 to conduct heat from sleeve 44 to water tank 62 through the contact area. Tanks 62 are also spaced around sleeve 44 to recover convection heat from sleeve 44. Water tanks 62 have a substantially cylindrical shape with a cylindrical side wall 64, an upstream end wall 66, and a downstream end wall 68. A conduit 70 extends between the respective end walls of adjacent water tank 62 as shown in FIGS. 4 and 5 to supply water sequentially through each of the tanks 62. The water flows through each tank 62 from one end to the opposite end before being supplied to the end of the adjacent tank. A first water tank 62' includes a water inlet 72 for supplying cold water to tank 62'. The cold water flows through each of the tanks 62 encircling sleeve 44 in sequence until the water reaches the last water tank 62" in the sequence as shown in FIG. 4. Water tank 62" includes a conduit 75 coupled to end plate 52 for supplying water to downstream end 50 of sleeve 44.

In use, heat exchanger 16 is coupled to flue pipe 12 which is connected to a furnace or other heat source as in the embodiments of FIGS. 1 and 2. Hot exhaust gases are passed through flue pipe 12 in the direction of arrows where heat from the exhaust gases is transferred to annular space 46. Cold water is supplied through inlet pipe 74 which circulates sequentially through each water tank 62. Each water tank 62 is preferably in direct contact with sleeve 44 so that heat is conducted from sleeve 44 to tanks 62. Preferably, tanks 62 are made from a corrosion resistant heat conducting metal such as galvanized steel, stainless steel or copper. Water is conducted through each of water tank 62 to tank 62" and then directed to the downstream end 54 of annular sleeve 44. The water is carried along the spiral path formed by baffle 56 through annular space 46 to outlet 60 at upstream end 50. Preferably, water flowing through annular space 46 is in direct contact with the outer surface 42 of pipe 12 to absorb heat conducted through the wall of pipe 12. Preferably, water is supplied to the downstream end of flue pipe and is carried toward the upstream end of flue pipe to maximize heat recovery from the exhaust gases since the upstream end of pipe 12 is the hottest portion.

Water is carried through the heat exchanger 16 in a manner to gradually increase the temperature of the water as it flows through the tanks 62 and then through annular space 46. Water tanks 62 are heated by residual heat passing through sleeve 44 to raise the temperature of the water in holding tanks 62. Water tanks 62 can also raise the temperature of the supply water by absorbing heat from the air surrounding heat exchanger 16. Preferably, holding tanks 62 have a volume greater than the volume of annular space 46 to provide a reservoir of preheated water. When hot water is needed, the water is drawn from holding tanks 62 through annular space 46 where the water is heated by direct contact with the outer surface of flue pipe 12. The preheated water exits the heat exchanger 16 through conduit outlet 60 which can be directed to a conventional water heater, storage tank or domestic water supply.

In a preferred embodiment, water tank 62" includes a pressure relief valve 76 to prevent over pressurization of the assembly. In the embodiment illustrated, pressure relief valve 76 is coupled to holding tank 62" so that pressure resulting in annular space 46 is directed through conduit 75 into water tank 62" so that water tank 62" functions as an expansion tank. In alternative embodiments, a pressure relief valve can be coupled directly to sleeve 44 or end plate 48 and 52 to prevent pressure buildup in annular space 46.

Heat exchanger 16 is typically enclosed in an insulating housing 78 shown in FIGS. 3 and 6. Preferably, housing 78 surrounds sleeve 44 and water tank 62 to retain the heat extracted from the exhaust gases discharged through flue pipe 12.

In one embodiment of the invention, flue pipe 12 includes a series of baffles 80 arranged along the length of flue pipe 12 spaced inwardly from sleeve 44. In the embodiment illustrated, baffles 80 have a substantially annular ring shape with an outer edge 82 coupled to the inner surface of flue pipe 12 such as by welding and an inner annular edge 84. Inner annular edge 84 defines a central opening that is preferably coaxially aligned with the center axis of flue pipe 12. Baffles 80 in the illustrated embodiment extend substantially radially inward a distance to produce turbulence in the flow of exhaust gases. Baffles 80 also define heating fins for extracting heat from the exhaust gas and conducting the heat directly to the wall of flue pipe 12 for heating water in annular space 46. Preferably, baffles 80 have a radial width sufficient to produce turbulence within flue pipe 12 and conduct heat through the wall of flue pipe without restricting the flow of exhaust gases. Typically, a drain 86 is provided at the downstream end of flue pipe 12 to allow condensation to drain from flue pipe 12 caused by cooling of the exhaust gases. Drain 86 preferably includes a drain pipe 88 which can include a trap 90.

Figure 7:
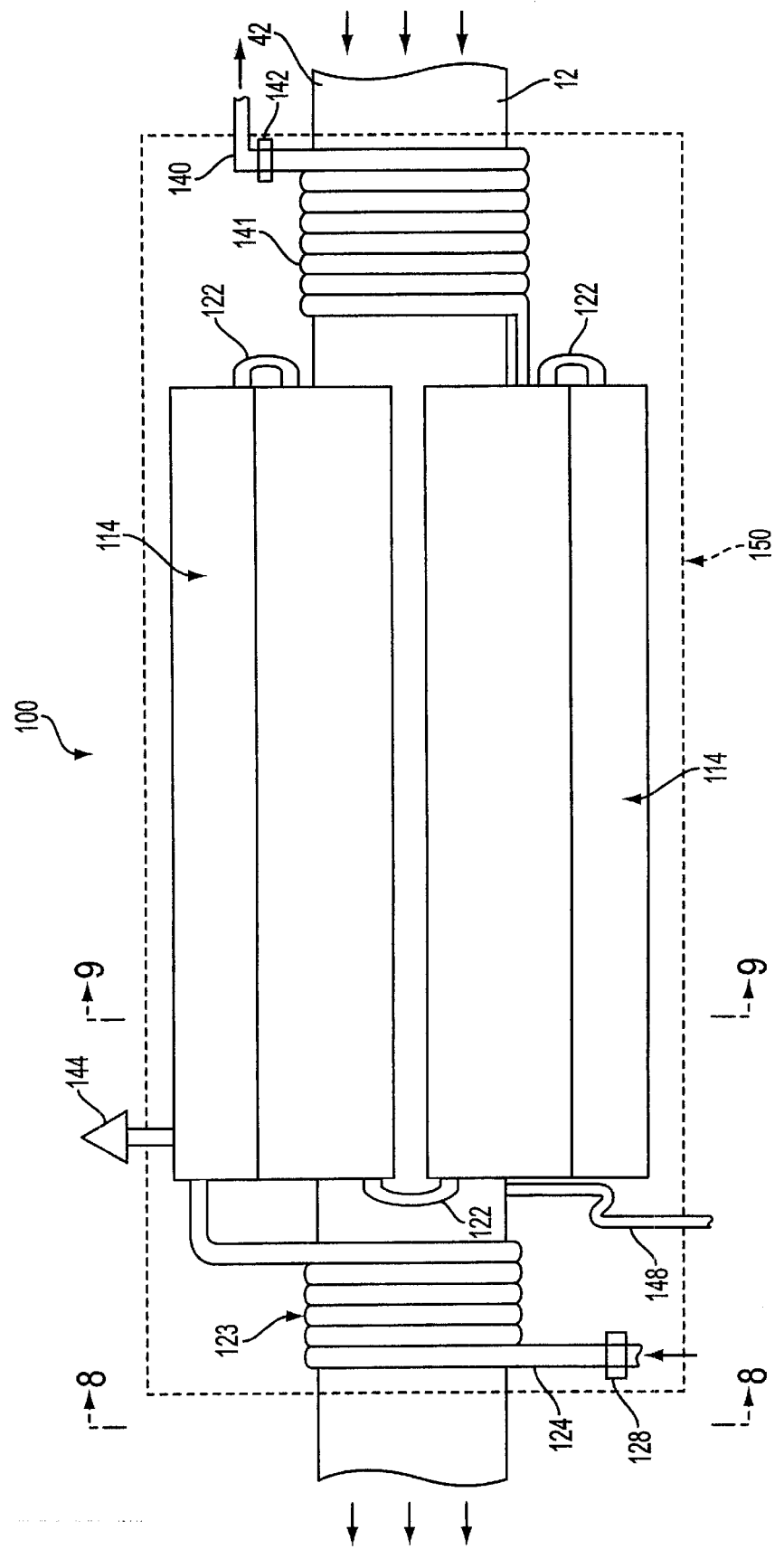
FIG. 7 is a side view of the heat exchanger in a second embodiment of the invention.
Figure 8:
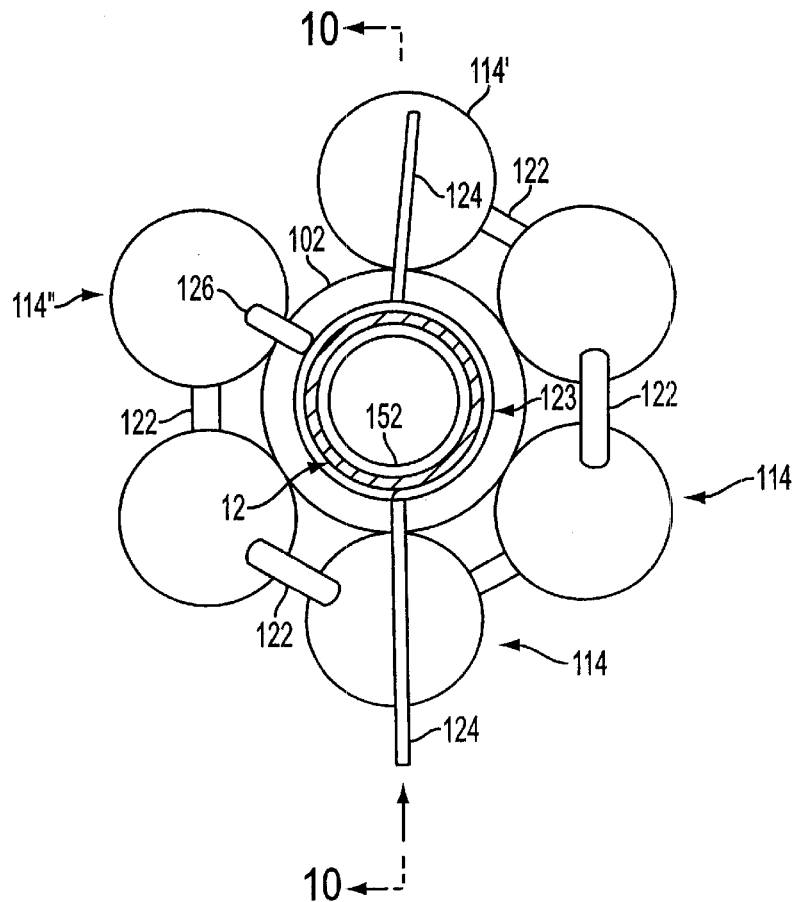
FIG. 8 is an end view of the heat exchanger of FIG. 7.
Figure 9:
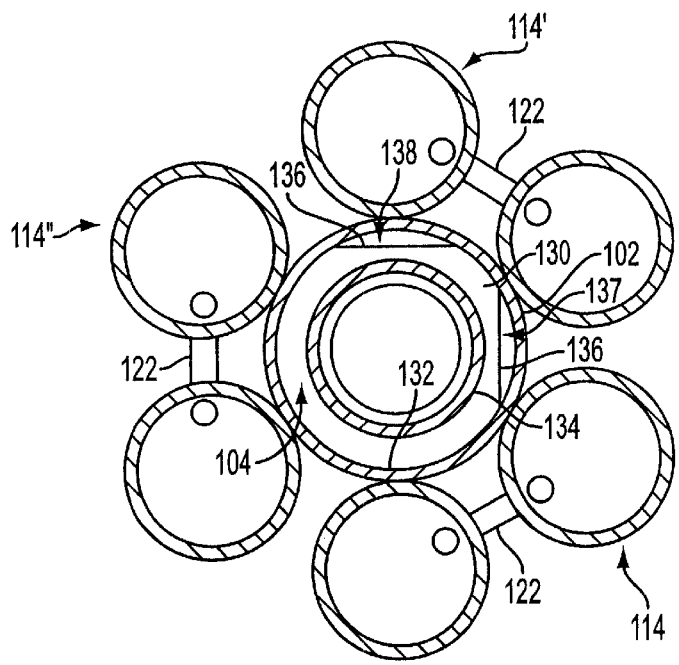
FIG. 9 is a cross-sectional end view of the heat exchanger of FIG. 7 taken along line 9—9 of FIG. 7.

FIGS. 7–10 illustrate a second embodiment of a heat exchanger 100 suitable for use in the invention. Heat exchanger 100 is also coupled to a flue pipe 12 having an outer surface 42 as in the previous embodiment. Referring to FIGS. 8 and 9, heat exchanger 100 includes a sleeve 102 having a substantially cylindrical shape surrounding flue pipe 12 and spaced radially outward therefrom to define a water jacket having an annular space 104. As in the previous embodiment, annular space 104 is defined by the outer surface 42 of flue pipe 12 and the inner surface of sleeve 102. Sleeve 102 includes an end plate 106 at the upstream end 108 of sleeve 102. An end plate 110 is coupled to a downstream end 112 of annular sleeve 104. End plates 106 and 110 have a substantially annular shape and an outer surface complementing the outer dimension of sleeve 102 and an inner dimension complementing the outer surface of flue pipe 12. Preferably, end plates 106 and 110 are coupled to sleeve 102 and flue pipe 12 to form a fluidtight seal to enclose annular space 104.

Figure 10:
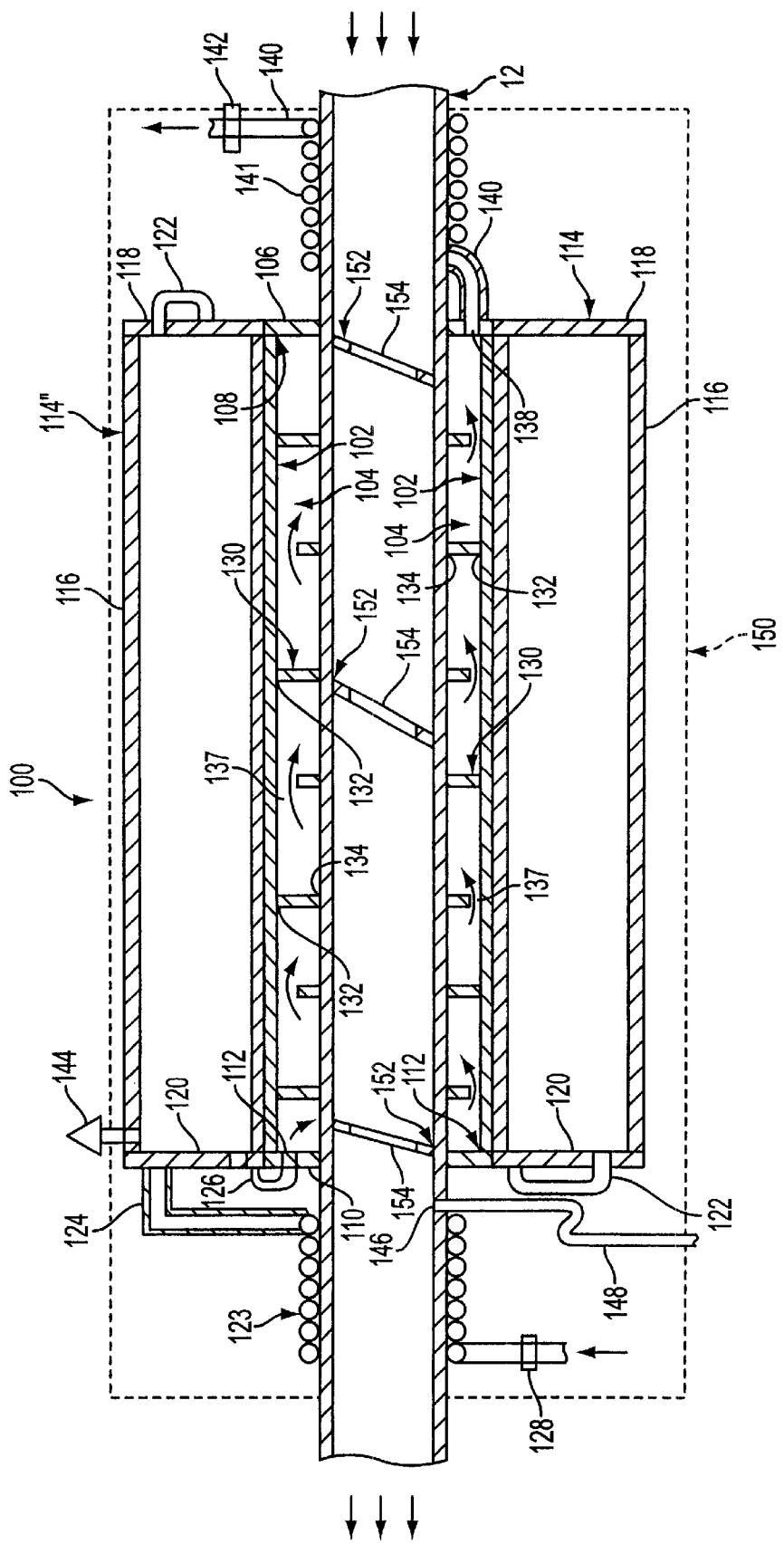
FIG. 10 is a cross-sectional view of the heat exchanger taken along line 10—10 of FIG. 8.

Several water tanks 114 are positioned around sleeve 102 and are preferably in direct contact with sleeve 102 to conduct heat from sleeve 102 to water tanks 114 in a manner similar to the previous embodiment. Preferably, water tanks 114 have a substantially cylindrical shape with a cylindrical side wall 116 and an upstream end wall 118 and a downstream end wall 120. Water tanks 114 generally have an axial length substantially equal to the axial length of sleeve 102 as shown in FIGS. 7 and 10. The end walls of water tank 114 are connected to a conduit 122 for providing fluid flow from one tank to an adjacent tank in sequence. Preferably, water tanks 114 are connected together in series so that water flow through the entire length of each tank 114 before flowing into the adjacent tank. As shown in FIGS. 7 and 8, the end wall 120 of a first tank 114' is connected to a conduit 124 for supplying water to the first tank 114'. The last water tank 114" in the sequence of water tanks includes a conduit 126 for directing water from the tanks to the downstream end of annular space 104.

Referring to FIG. 7, conduit 124 for supplying water to tank 114' is wrapped in a spiral fashion around flue pipe 12 at the downstream end of heat exchanger 100 to define a coil 123. Preferably, conduit 124 is in direct contact with flue pipe 12 to form a heat exchange pipe so that heat is conducted directly from flue pipe 12 to water flowing through conduit 124. Conduit 124 is wrapped several turns around flue pipe 12 to provide the desired preheating of water flowing through conduit 124. The number of turns forming the coiled section can vary depending on the desired preheating of the water. Preferably, conduit 125 is coupled to a one way check valve 128 to prevent backflow of water from heat exchanger 100. As in the previous embodiment, conduit 124 is connected to a water supply to supply cold water to heat exchanger 100.

Referring to FIGS. 9 and 10, annular space 104 includes several baffles 130 spaced apart the axial length of annular space 104. In this embodiment of the invention, baffles 130 have a substantially annular ring shape with an outer annular edge 132 having a dimension to engage the inner surface of sleeve 102 as shown in FIG. 9. Baffles 130 include an annular inner edge 134 having a dimension to engage the outer surface of flue pipe 12. Each baffle 130 includes a notch portion 136 that is removed or cut from each baffle 130 to define an opening 137 to allow the flow of water through annular space 104. In the embodiment illustrated, two notches 136 are formed on each baffle 130 and are spaced along one side of each baffle 130. Preferably, the notches 136 are formed in the outer annular edge 132 of each baffle 130. In alternative embodiments, notches can be cut in the inner edge 134 of each baffle 130. As shown in FIG. 10, the notches 136 of each baffle 130 are preferably staggered in an alternating arrangement with notches 136 alternating on opposite sides of flue pipe 12 to provide a tortuous path of water flowing through annular space 102.

End plate 106 includes an opening 138 coupled to a conduit 140 for discharging preheated water from annular space 104. Conduit 140 is wrapped around flue pipe 12 in a spiral fashion to define a coil 141 as shown in FIG. 7 and FIG. 10. Preferably, conduit 140 is in direct contact with flue pipe 12 to form a heat exchange pipe and is wrapped a number of turns sufficient to preheat the water to the desired temperature. Conduit 140 preferably includes a check valve 142 to prevent backflow of water into annular space 104.

As in the previous embodiment, at least one tank 114 includes a pressure relief valve 144 to relieve pressure from the system. Flue pipe 12 also includes a drain 146 connected to a drain pipe 148 at the downstream end of flue pipe 12 to remove condensation that may form in flue pipe 12. Preferably, heat exchanger 100, the spiral wrappings of conduit 122 and the spiral wrappings of conduit 140 are enclosed in a thermally insulating housing 150.

In the embodiment illustrated in FIG. 10, flue pipe 12 includes an internal baffle 152 coupled to the inner surface of flue pipe 12. In this embodiment, baffles 152 have a substantially annular ring shape with a central opening 154 that is coaxially aligned with the center axis of flue pipe 12. Baffles 152 are oriented at an incline with respect to the radial dimension of flue pipe 12 to produce turbulence of the exhaust gas flowing through flue pipe 12. Preferably, baffles 52 are coupled directly to the inner surface of flue pipe 12 and made of a heating conducting material to conduct heat from the exhaust gases directly to the flue pipe 12 for heating annular space 104.

In this embodiment, cold water is supplied to inlet conduit 124 which flows through the coil 123 around flue pipe 12 to preheat the water. The preheated water is then carried through conduit 124 to the storage tanks 114. The water flows sequentially through each of the water tanks 114 to the downstream end of annular space 104. The water is carried through annular space 104 in a tortuous path formed by the baffles 130 to the outlet 138 at the upstream end of flue pipe 12 and sleeve 102. The preheated water is carried through conduit 140 and through the coil 141 around flue pipe 12 to further heat the water. The preheated water is then carried from conduit 140 to a conventional water heater as in the embodiments illustrated in FIGS. 1 and 2 or directly to a water supply for domestic use.

While several embodiments have been chosen to illustrate the invention, it will be appreciated by those skilled in the art that various changes and modifications can be made without departing from the scope of the invention as defined in the appended claims.

What is claimed is:

1. A water heating assembly comprising:

a furnace for discharging hot exhaust gases and having a flue pipe for discharging said hot exhaust gases, said flue pipe having an axial passage with an inlet end for receiving said hot combustion gases and an outlet end for discharging said hot combustion gases, said flue pipe having an outer surface and an inner surface defining said axial passage, and a first baffle member coupled to said inner surface of said flue pipe and extending inwardly into said axial passage to produce turbulence of said exhaust gases flowing through said axial passage;

a substantially cylindrical sleeve having an upstream end at said upstream end of said flue pipe and a downstream end at said downstream end of said flue pipe, said sleeve being spaced outwardly from said flue pipe to define a water jacket in contact with and surrounding said flue pipe;

an inlet pipe coupled to said downstream end of said sleeve for feeding water into said water jacket;

an outlet pipe coupled to said upstream end of said sleeve for discharging water from said water jacket;

a plurality of water tanks arranged parallel to each other and connected together in series for feeding water sequentially through each of said water tanks, said water tanks being in heat exchange contact with said sleeve and being arranged to surround said sleeve, at least one of said water tanks being connected to said inlet pipe of said water jacket;

a first heat exchange pipe encircling said flue pipe a plurality of turns at said downstream end and being in heat exchange contact with said flue pipe, said first heat exchange pipe having an inlet end connected to a water supply and an outlet end coupled to at least one of said water tanks; and a second heat exchange pipe encircling said flue pipe a plurality of turns at said upstream end and being in heat exchange contact with said flue pipe, said second heat exchange pipe having an inlet end coupled to said outlet pipe for receiving water from said water jacket and an outlet end for supplying hot water.

2. The assembly of claim 1, comprising at least two of said first baffle members coupled to said inner surface of said flue pipe and extending inwardly into said axial passage in a substantially radial direction.

3. The assembly of claim 2, wherein said first baffle members have a substantially annular ring shape with an inner edge defining an opening aligned with said axial passage and an outer edge coupled to said inner surface of said flue pipe.

4. The assembly of claim 1, further comprising a second baffle in said sleeve to define a tortuous path through said water jacket from said downstream end to said upstream end.

5. The assembly of claim 4, wherein said second baffle has a spiral shape extending from said downstream end to said upstream end to define a spiral path through said water jacket.

6. The assembly of claim 4, wherein said second baffle in said water jacket extends between said flue pipe to said inner surface of said sleeve and includes at least one opening to allow water to flow through said water jacket.

7. The assembly of claim 6, comprising a plurality of said second baffles wherein each of said second baffles have an annular shape with an inner annular edge coupled to said outer surface of said flue pipe, and an outer annular edge coupled to said inner surface of said sleeve, said second baffles having at least one notched portion on said outer edge defining said opening, said second baffles being spaced apart along an axial length of said sleeve and being oriented to stagger said notched portion along said axial length of said sleeve.

8. The assembly of claim 1, further comprising a thermally insulating enclosure enclosing said first heat exchange pipe, said second heat exchange pipe, said sleeve and said water tanks.

9. The assembly of claim 1, further comprising at least one check valve to direct a flow of water from said inlet of said first heat exchange pipe to said outlet of said second heat exchange pipe, and at least one pressure relief valve to relieve pressure from said water jacket.

10. A water heating assembly comprising:

a flue pipe having an inlet end for receiving hot exhaust gases and an outlet end for discharging said exhaust gases;

a substantially cylindrical sleeve having an upstream end at said upstream end of said flue pipe and a downstream end at said downstream end of said flue pipe, said sleeve being spaced outwardly from said flue pipe to define a water jacket in contact with said flue pipe;

an inlet pipe coupled to said downstream end of said sleeve for feeding water into said water jacket;

an outlet pipe coupled to said upstream end of said sleeve for discharging water from said water jacket;

a plurality of water tanks arranged parallel to each other and connected together in series for feeding water sequentially through each of said water tanks, said water tanks being in heat exchange contact with said sleeve and being arranged to surround said sleeve, at least one of said water tanks being connected to said inlet pipe;

a first heat exchange pipe encircling said flue pipe a plurality of turns at said downstream end and being in heat exchange contact with said flue pipe, said first heat exchange pipe having an inlet end connected to a water supply and an outlet end coupled to at least one of said water tanks; and a second heat exchange pipe encircling said flue pipe a plurality of turns at said upstream end and being in heat exchange contact with said flue pipe, said second heat exchange pipe having an inlet end coupled to said outlet pipe for receiving water from said water jacket and an outlet end for supplying hot water.

11. The assembly of claim 10, wherein said flue pipe has an axial passage with an inlet end for receiving said hot exhaust gases and an outlet end for discharging hot exhaust gases, said flue pipe having an outer surface and an inner surface defining said axial passage, and at least two spaced apart first baffles made of a heat conducting material for transferring heat from said exhaust gases to said flue pipe, each said first baffles having a substantially annular shape with an outer annular edge and inner annular edge, said outer annular edge being coupled to said inner surface of said flue pipe and said inner surface being aligned with said axial passage.

12. The assembly of claim 10, further comprising a plurality of second baffles in said sleeve to define a tortuous path through said water jacket from said downstream end to said upstream end.

13. The assembly of claim 12, wherein said second baffles in said water jacket extend between said flue pipe to an inner surface of said sleeve and include at least one opening to allow the water to flow through said water jacket.

14. The assembly of claim 13, wherein each of said second baffles have an annular shape with an inner annular edge coupled to said outer surface of said flue pipe, and an outer annular edge coupled to said inner surface of said sleeve, said second baffles having at least one notched portion on said outer edge defining said opening, said second baffles being spaced apart along an axial length of said sleeve and being oriented to stagger said notched portion along said axial length of said sleeve.

15. The assembly of claim 10, further comprising a thermally insulating enclosure enclosing said first heat exchange pipe, said second heat exchange pipe, said sleeve and said water tanks.

16. The assembly of claim 10, further comprising at least one check valve to direct a flow of water from said inlet of said first heat exchange pipe to said outlet of said second heat exchange pipe, and at least one pressure relief valve to relieve pressure from said water jacket.

17. A heat exchange assembly comprising:
a flue pipe having an upstream end for receiving hot exhaust gases and a downstream end for discharging said exhaust gases;
a sleeve surrounding said flue pipe and having an upstream end and a downstream end, said upstream end being proximate said upstream end of said flue pipe, said sleeve being spaced outwardly from said flue pipe to define a water jacket, said water jacket having a water inlet at said downstream end of said flue pipe and a water outlet at said upstream end of said flue pipe;
a plurality of parallel water holding tanks contacting an outer surface of said sleeve, each of said water holding tanks having an inlet at a first end and an outlet at a second end, and being connected together in series, at least one of said water holding tanks having a respective inlet connected to a water source for supplying water sequentially through each of said water holding tanks, and wherein at least one of said holding tanks having its respective outlet connected to said inlet of said water jacket at said downstream end of said flue pipe, whereby water flows through said water holding tanks and said water jacket.

18. The assembly of claim 16, wherein said water holding tanks have a substantially cylindrical side wall, annular end walls extending radially inward from said side wall, and having a longitudinal dimension parallel to a longitudinal axis of said flue pipe, said side wall of each of said tanks contacting said sleeve in a heat exchange relation.

19. The assembly of claim 17, wherein said flue pipe has a substantially cylindrical shape and an axial passage, at least two axially spaced apart first baffles coupled to an inner surface of said flue pipe, said first baffles having an annular shape with an annular inner edge defining an opening aligned with said axial passage, and wherein said sleeve includes at least one second baffle coupled to an outer surface of said flue pipe and extending outwardly toward an inner surface of said sleeve to define a tortuous path through said water jacket from said downstream end to said upstream end.

20. The assembly of claim 19, wherein said at least one second baffle extends between said outer surface of said flue pipe and said inner surface of said sleeve, and wherein said at least one second baffle has a spiral shape to define a spiral shape from said downstream end to said upstream end of said water jacket.

21. The assembly of claim 19, comprising a plurality of said second baffles spaced apart along an axial length of said water jacket, each of said second baffles having an annular shape with an outer annular edge and an inner annular edge, said outer annular edge having at least one notch formed therein and being coupled to said inner surface of said sleeve, and said inner annular edge being coupled to said outer surface of said flue pipe, and wherein said notches are staggered with respect to an adjacent second baffle to define said tortuous path.

22. The assembly of claim 19, further comprising a first heat exchange pipe encircling said flue pipe, a plurality of turns at said outlet end and in direct contact with said flue pipe, said first heat exchange pipe having an inlet coupled to a water source and an outlet end coupled to an inlet of at least one of said water tanks, and a second heat exchange pipe encircling said flue pipe a plurality of turns at said inlet end of said flue pipe, said second heat exchange pipe having an inlet end coupled to said outlet of said water jacket and an outlet end for supplying heated water.

* * * * *